United States Patent
Raidel, II et al.

(10) Patent No.: US 6,659,479 B1
(45) Date of Patent: Dec. 9, 2003

(54) ADJUSTABLE SUSPENSION HANGER ASSEMBLY

(75) Inventors: John Raidel, II, Springfield, MO (US); Emmitt A. Scammahorn, Billings, MO (US); William Chaffin, Lebanon, MO (US)

(73) Assignee: Ridewell Corporation, Springfied, MO (US)

( * ) Notice: Subject to any disclaimer, the term of this patent is extended or adjusted under 35 U.S.C. 154(b) by 0 days.

(21) Appl. No.: 10/197,985

(22) Filed: Jul. 18, 2002

(Under 37 CFR 1.47)

(51) Int. Cl.[7] .............................................. B60G 7/00
(52) U.S. Cl. ............................ 280/86.75; 280/124.16
(58) Field of Search ........................... 280/86.75, 86.751, 280/86.753, 124.11, 124.117, 124.116

(56) References Cited

U.S. PATENT DOCUMENTS

| | | | |
|---|---|---|---|
| 3,960,388 A | 6/1976 | Strader et al. | 280/693 |
| 4,267,896 A | 5/1981 | Hendriksen | 180/73 |
| 4,493,493 A | 1/1985 | Satchell et al. | 280/661 |
| 4,991,868 A * | 2/1991 | VanDenberg | 280/86.75 |
| 5,171,036 A * | 12/1992 | Ross | 280/124.116 |
| 5,288,100 A | 2/1994 | Cherry et al. | 280/688 |
| 5,683,098 A | 11/1997 | VanDenberg | 280/713 |
| 6,131,930 A | 10/2000 | Chalin | 280/86.75 |
| 6,550,795 B1 * | 4/2003 | Schlosser et al. | 280/86.75 |

* cited by examiner

Primary Examiner—Robert P. Swiatek
(74) Attorney, Agent, or Firm—Lathrop & Gage, L.C.

(57) ABSTRACT

A suspension hanger assembly for receiving the bush end of a control arm is provided for adjusting axle alignment, without vertical displacement, and includes spaced-apart sides; each having aligned bores for a spindle, a bush pin and a fastening bolt. Two cams, having openings for the spindle, bush pin and fastening bolt, are aligned with the bracket bores. The bush pin bore of the bracket is horizontally elongated limiting vertical displacement of the bush pin. The fastening bolt opening of each cam is arcuate-shaped which allows cam actuation in an eccentric pattern. As the cam is moved, the bush pin moves horizontally respective to the bracket. The control arm bush is secured via the bush pin and fastening bolt. The control arm is fixed to the axle and horizontal movement of the control arm within the hanger bracket results in linear movement of that axle respective to the vehicle chassis.

11 Claims, 3 Drawing Sheets

ADJUSTABLE SUSPENSION HANGER ASSEMBLY

FIELD OF INVENTION

The present invention is directed to a suspension hanger having an adjustment cam which provides limited horizontal adjustment for alignment of an axle relative to a vehicle chassis.

BACKGROUND OF THE INVENTION

The present invention relates to an adjustable suspension hanger, which allows limited adjustment, within the horizontal plane, for alignment of the vehicle axle in relation to the vehicle chassis, a control arm and axle attachment assembly, which facilitates ease of adjustment, removal and replacement of the axle.

A common reoccurring problem in vehicle suspension systems is misalignment of the axle in relation to the vehicle chassis. Such misalignment contributes to increased tire and axle component wear. Further, significant misalignment can adversely impact the steerability of the vehicle potentially resulting in lost control.

The known methods and systems for vehicle suspension alignment, particularly heavy truck and trailer suspensions, generally involve lengthy and complex manipulation or adjustment of the suspension itself or require welding, drilling, or additional fastening of suspension components. It is not uncommon, on heavy-duty suspensions, to eliminate undesirable axle travel or misalignment, by welding the control arm fastener to the hanger bracket once alignment is achieved. Some manufacturers choose not to provide any alignment adjustment at the hanger bracket but rather rely on achieving permanent alignment at the time of manufacture. On many systems it is necessary to remove all, or a portion of the axle assembly to replace or add parts to ensure appropriate alignment. Preferably, the alignment operation is performed without removing any components or parts from the vehicle and should be convenient and inexpensive.

Particular problems exist in alignment of heavy-duty axles or suspension systems utilized in commercial, high load, vehicles. Unlike passenger vehicles, commercial vehicles generally have heavy-duty axles and suspensions which are difficult to maneuver or adjust and are generally expensive to repair. Any alignment system which requires welding, removal of components, replacement of components, or suspension disassembly is undesirable. Common axle alignment methods often require partial disassembly of the suspension mechanism, particularly at the hanger, and require the insertion or extraction of shims between the control arm bush and the hanger bracket.

It is also common to find large eccentric bores formed through the vehicle hanger bracket which, when the control arm pin is fitted with large washers or cams, allow significant movement of the control arm bush within the hanger bracket. While only horizontal displacement of the axle relative to the vehicle chassis is desirable during the alignment process, it is common to experience vertical displacement of the axle with known systems utilizing a large eccentric bore and compression bolts, or similar fasteners, to facilitate alignment.

Alignment of these relatively simple systems typically requires loosening the bush pin, or compression bolt, and manipulating the control arm within the confines of the bore provided through the hanger. When the desired positioning is acquired, the fastener is secured and will generally retain the control arm position within the hanger. However, any undesirable vertical movement of the control arm and attached axle relative to the vehicle chassis imparts uneven force on the vehicle frame, which results in vertical frame misalignment.

Moreover, most alignment methods often require significant trial and error to find the desired alignment as they lack means for manipulating the control arm within the bracket. A typical method for aligning would include raising the vehicle from the ground, loosening the control arm bush pin and applying significant horizontal force to the vehicle axle, such as with a ram or hammer.

At this time, there are no known suspension assemblies which allow easy and inexpensive horizontal alignment of heavy duty, commercial grade, axles. It is therefore desirable to provide an axle alignment system which is easy to operate, which eliminates vertical displacement of the axle during alignment and which does not require any disassembly or replacement of parts. It is also desirable to provide a heavy-duty axle alignment system which eliminates welding. Further, it is desirable to provide an axle alignment system which, when positioned and correctly fastened, eliminates unwanted movement which results in misalignment.

The present invention addresses the above described problems and limitations standard in the art by providing a suspension hanger mechanism which allows easy, inexpensive and secure horizontal alignment of the vehicle axle relative to the vehicle chassis. A specially formed cam mounted to the suspension hanger bracket allows limited horizontal adjustment of the control arm bush within the hanger bracket assembly. A series of uniquely designed spaced-apart bores within the hanger bracket and the cam eliminate undesirable vertical displacement during the alignment process. Further, multiple fastening points through the hanger bracket and cam limit unintentional displacement of the axle during use.

DISCLOSURE OF THE INVENTION

The present invention addresses the above described problem and limitations standard in the art by providing a suspension hanger mechanism which utilizes a specially formed cam mounted to the suspension hanger bracket to facilitate easy adjustment of the control arm bush within the hanger bracket assembly. The adjustment system provides a series of uniquely designed spaced-apart bores within the hanger bracket and the cam to allow alignment without suspension disassembly and to eliminate undesirable vertical displacement during the alignment process.

A suspension hanger bracket is fixed in a typical downward orientation to a vehicle cross member or chassis. The hanger bracket has opposing sides configured to receive the bush end of a suspension control arm. Substantially near the lower edge of each hanger bracket side, a plurality of bores are provided. The bores include, starting at the top, a horizontally elongated bush pin bore and a fastener bore. The bores of each hanger side are in axial alignment with the bores of the opposing side. A bush end of a suspension control arm is received between the opposed sides of the hanger bracket, orientated so that the horizontally elongated bush pin bore is in axial alignment with the pin hole in the control arm bush. To reduce the possible deformation of the hanger bracket sides, it is preferable to install a reinforcement plate on each hanger bracket side over the series of bores. It is preferable that the reinforcement plate be of hardened steel and it must be provided with a spindle bore along with a horizontally elongated pin bore and fastening bore of the same size and orientation as those described in the bracket side.

A specially shaped cam facilitates fore and aft adjustment of the suspension control arm within the hanger bracket. The cam, preferably spade shaped, is provided with a series of openings commensurate with the hanger bracket and reinforcement plate bores. The cam has a spindle opening, a bush pin opening and an arcuate-shaped fastener opening.

A cam is positioned on the outside face of both opposed hanger bracket sides so that the series of cam openings are aligned with the series of bracket and reinforcement plate bores. Prior to positioning the control arm bush in the hanger bracket, short fasteners, preferably hardened carriage bolts, are fitted from inside the hanger brackets through the reinforcement plate fastener bore and the arcuate shaped fastening opening within the cam. It is preferred that the fastener bore of the reinforcement plate is square to prevent turning of the carriage bolt once it is in place. Use of the reinforcement plate allows the carriage bolt head to be recessed into the hanger bracket side to avoid contact between the bolt and the control arm bush.

The bush end of the control arm is positioned between the opposed bracket sides and a bush fastener is fitted through the bush pin opening through the cam and the horizontally elongated bush pin bores of the opposed bracket sides and reinforcement plates. A short spindle is movably positioned within the spindle opening of each cam into the spindle bore of the reinforcement plate. The spindle may be welded or preformed onto the cam.

A square opening is formed in the cam, substantially adjacent the fastening opening. When the bush pin and the fastening bolt are loosened, the control arm bush can be manipulated horizontally within the hanger bracket by applying force to the square opening with a breaker bar. The cam moves in an eccentric circuit due to the arcuate-shaped fastener opening. The cam moves about the fastening bolt which is retained within the fastening bore of the reinforcement plate. The bush pin opening of the hanger bracket prevents vertical displacement of the bush pin relative to the hanger while allowing horizontal displacement of the bush pin within the horizontally elongated bush pin bore in the hanger bracket sides. The spindle provides a pivot about which the. cam moves. The arcuate-shaped fastener opening compensates for, and eliminates vertical displacement, by allowing the cam to travel an eccentric circuit while maintaining the bush pin within a horizontal plane defined by the horizontally elongated bush pin bore the hanger bracket.

When the desired alignment of the axle is achieved, determined by the control arm bush orientation within the hanger bracket, the bush pin and fastening bolts are tightened. The fastener bolts and bush pin provide two distinct compression points which secures the control arm bush relative to the bracket and greatly reduces the potential for undesired displacement during vehicle operation.

When the axle is aligned and the bush pin and fastening bolts are secured, significant pressure should be exerted to maintain control arm bush positioning. The suspension hanger is also provided with an upper shock absorber bracket, preferably on the inboard side, substantially near the mounting plate.

As the control arm is fixed to the axle any change in relation between the bush end of the control arm in the suspension bracket results in linear forward or rearward movement of that axle with respect to the vehicle chassis.

Each suspension system requires two opposed hanger brackets positioned on either side of the vehicle chassis. It is understood that the disclosure herein specifically describes a single hanger bracket and the second hanger bracket would be a mirror image of the first.

DETAILED DESCRIPTION OF THE PREFERRED EMBODIMENTS

This suspension alignment system is designed for installation on a vehicle, preferably heavy trucks, trailers and commercial equipment, having a pair of substantially parallel chassis side rails with a plurality of cross-members there between. It is understood that the suspension assembly is duplicated on both sides of the chassis with the axle as well as the chassis being similarly connected to both assemblies. Since each suspension assembly is identical, only a single assembly will be described.

Figure 1:
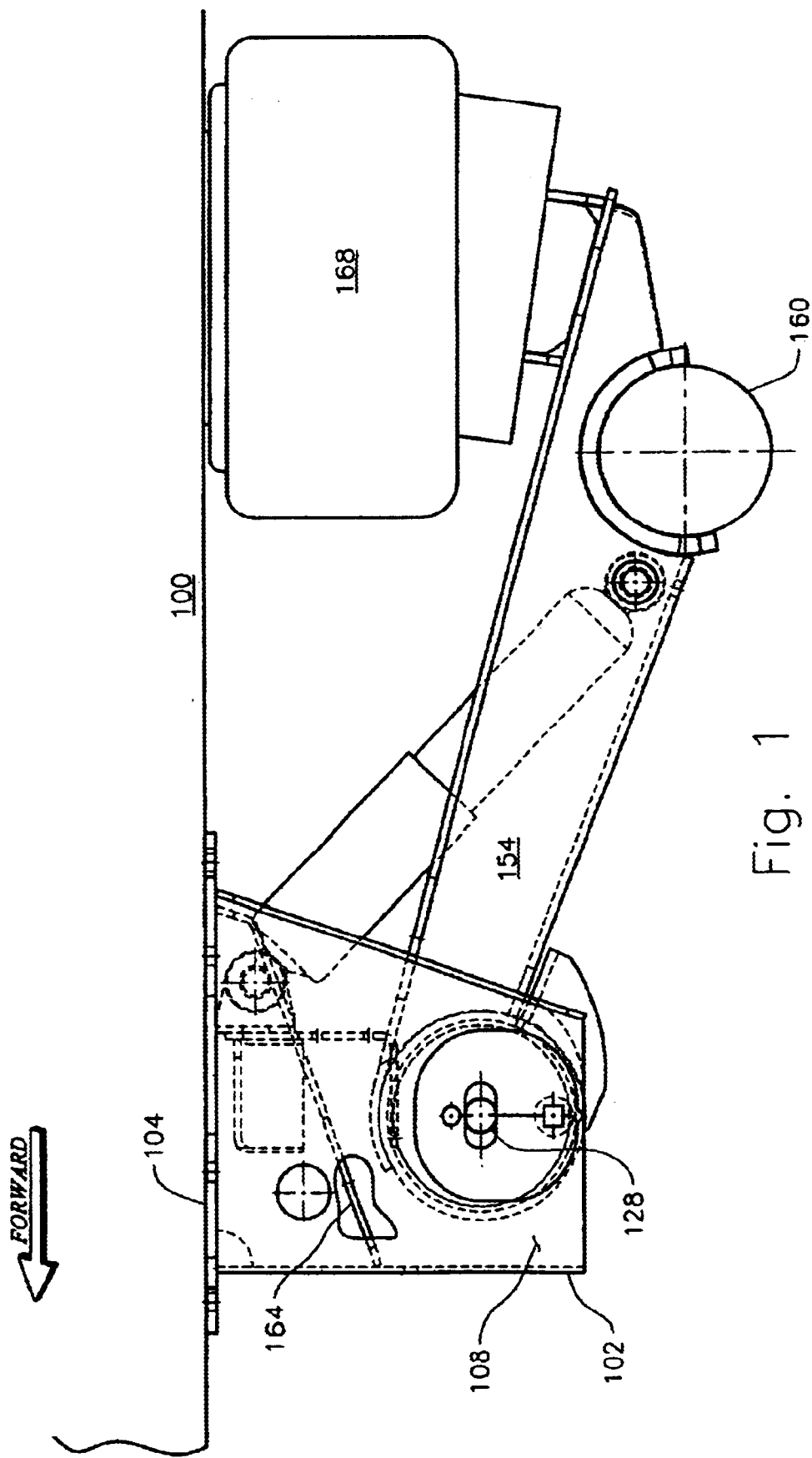
FIG. 1 is a perspective view of a one embodiment of the inventive vehicle suspension hanger.

Referring now to FIG. 1, a hanger bracket assembly 102 is provided which is preferably formed from hardened plate steel. A mounting plate 104, which is preferably welded to the chassis 100, is also provided with a plurality of mounting holes for bolting the assembly to a vehicle chassis. The mounting plate secures the hanger bracket assembly to the vehicle and is utilized to strengthen attachment points on the hanger bracket assembly. A control arm 154 extends from the hanger assembly and attaches to a spaced-apart axle 160. An air spring 168, or a similar spring mechanism is mounted substantially above the control arm 154 at its most rearward position and to the vehicle chassis 100.

Figure 2:
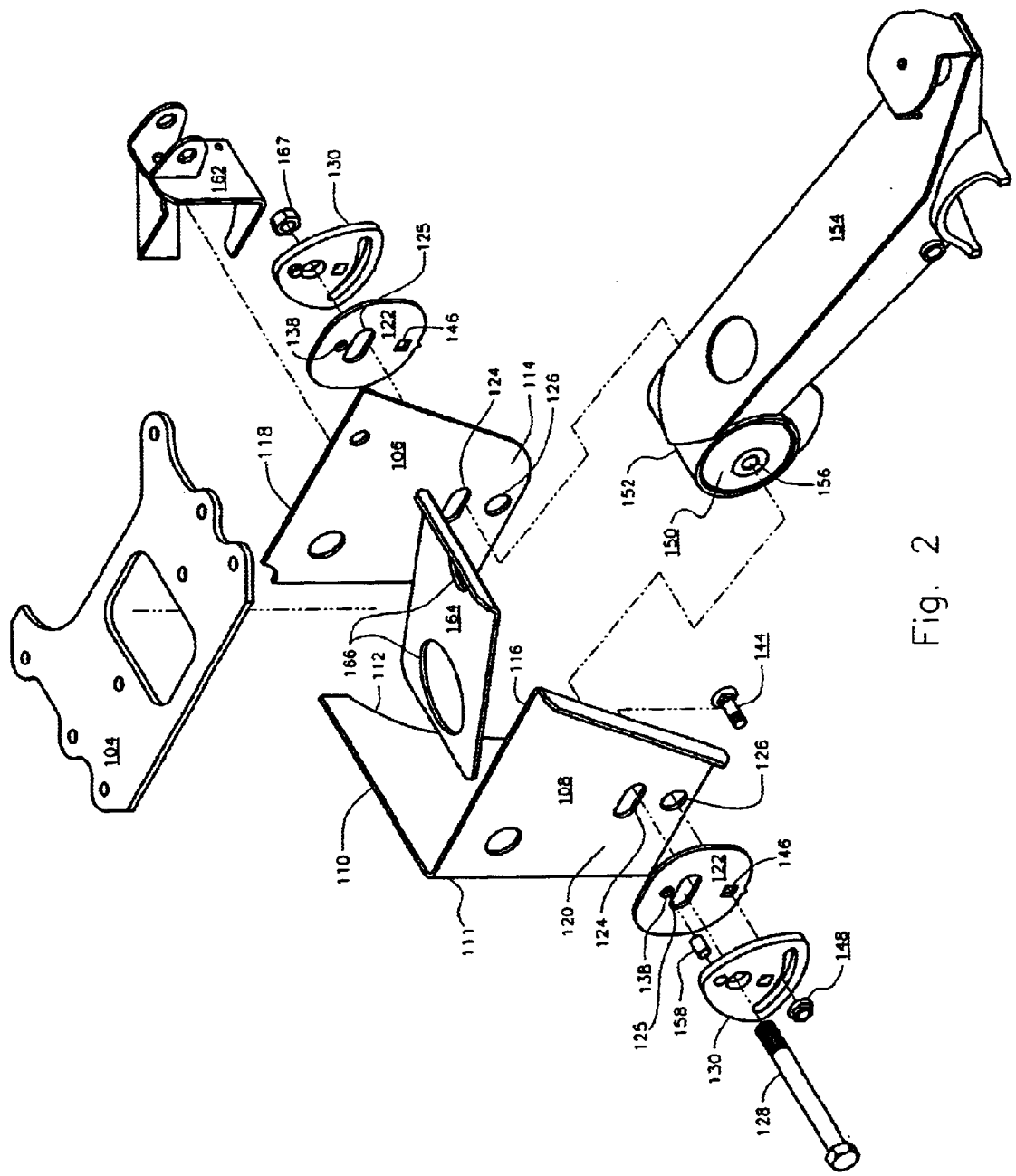
FIG. 2 is an exploded view of one embodiment of the inventive vehicle suspension hanger.

As shown in FIGS. 1 and 2, an inboard hanger side 106 is fixed perpendicularly to the mounting plate 104 in a generally downward orientation. An outboard hanger side 108 is also fixed perpendicular to the mounting plate and is parallel and in alignment with the inboard hanger side 104.

The outboard hanger side 108 may be used to form a frontal plate 110 by bending the material of the outboard hanger side 108 approximately 90 degrees and fixing the bent portion 111 of the frontal plate 110 to the mounting plate 104 and the inboard hanger side 106. Further, the frontal plate 110 may extend beyond and perpendicular to the inboard hanger side 106 to form a lateral flange 112 which reduces the flex of the hanger, particularly during vehicle braking and cornering.

The inboard hanger side 106 further has an inside face 114 and an outer face 118 and the outboard hanger side 108 similarly has an inside face 116 and an outside face 120. To reduce the possible deformation of the hanger bracket sides 106 and 108, it is preferable to install a reinforcement plate 122 on the hanger side outside faces 118 and 120 such that each reinforcement plate 122 is substantially aligned with and adjacent to a lower edge of each outside face 118 and 120. It is preferable that each side reinforcement plate 122 is formed of hardened steel and welded to outer faces 118 and 120 of hanger bracket sides 106 and 108 respectively. To further strengthen the hanger bracket assembly 102, it is preferred to fix a torsion plate 164 to the lateral flange 110 and to the inside faces 114 and 116 of hanger bracket sides 106 and 108 respectively. The torsion plate 164 may include clearance holes 166 to allow access to fasteners for securing the mounting plate 104.

A series of bores is provided, in axial alignment, through both hanger bracket sides 106 and 108. At the uppermost position in the series of bores is a horizontally elongated bush pin bore 124 and a fastener bore 126. The bush pin bore 124 is horizontally elongated to allow linear movement of a bush pin 128 within the bore 124, but is sized to restrict vertical movement of the bush pin 128 within the bore 124. Adjacent to and below the bush pin bore 124, a fastening bolt access bore 126 is provided through the hanger bracket sides. Each reinforcement plate 122 must be provided with a horizontally elongated pin bore 125 which is similar in dimension to that provided in each bracket side 106 and 108.

Figure 3:
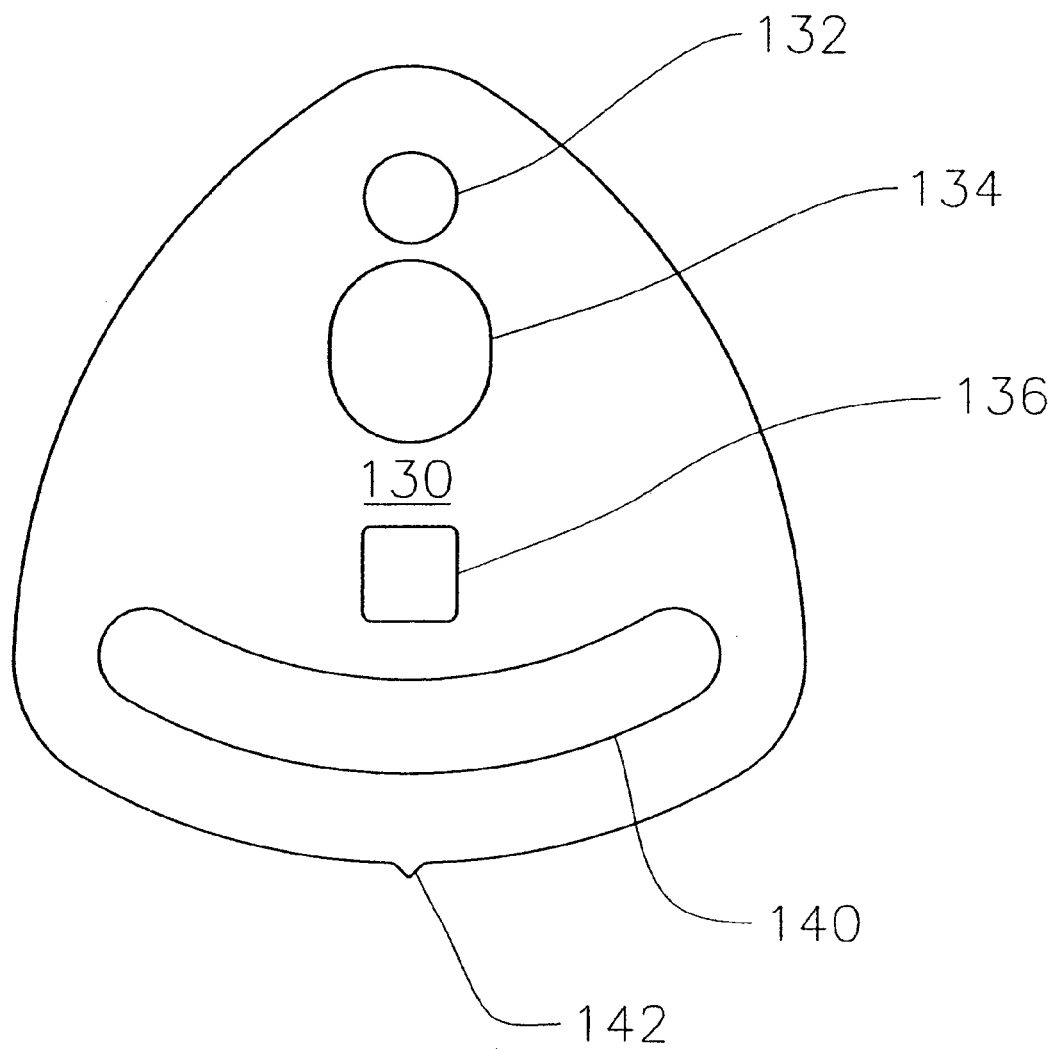
FIG. 3 is a perspective view of the suspension hanger adjustment cam.

A cam, or fore/aft adjustment plate, 130 as shown in FIGS. 2 and 3, is preferably formed of hardened steel and is generally spade-shaped. At least one such cam 130 is positioned outboard each reinforcement plate 122 and is substantially aligned with the series of provided bores 124, 126 in the hanger brackets sides 106 and 108 as best shown in FIG. 2. As shown in FIG. 3 each cam 130 has, in alignment, a spindle bore 132, a bush pin opening 134, a square opening 136 and an arcuate-shaped fastening bolt opening 140. Each cam 130 overlies a reinforcement plate 122 at each outer face 118 and 120 of the hanger bracket sides 106 and 108, such that the spindle bore 132 of the cam 130 aligns with the spindle hole 138 of the reinforcement plate 122, the bush pin opening 134 aligns with the horizontally elongated bush pin bores 124 and 125 and the arcuate-shaped fastening bolt opening 140 aligns with the fastening bolt bore 126. A tang 142 is integrally formed in the cam substantially near the arcuate-shaped fastening bolt opening 140 and oriented in a generally downward position. The tang 142 is preferred to allow visual orientation of the cam relative to the stationary reinforcement plates 122. The tang 142 may be configured as a generally square projection for grasping with a common spanner or wrench for manipulating the cam 130 laterally with respect to the hanger sides 106 and 108 for the purpose of aligning the control arm bush. The tang 142 can be configured for grasping an manipulating, for alignment purposes, in any size and shape which can be grasped with a tool.

Referring again to FIG. 2, each cam 130 is positioned at the outer face 118 and 120 of the hanger bracket sides 106 and 108 respectively. Each provided opening through the cam 130 is aligned with the bores of the adjacent reinforcement plate 122 and hanger sides 106 or 108. A fastening bolt 144 is positioned through each of the fastening bolt access bores 126 of each the hanger sides 106 and 108, through the reinforcement plate square opening 146 and through the arcuate-shaped fastening bolt opening 140 of each cam 130. The preferred fastening bolt 144 is a carriage bolt having a substantially flat head and a square shoulder above common threads. Each fastening bolt bore 146 should be square and sized to accommodate the square shoulder of the fastening bolt. Preferably, the fastening bolt 144 is positioned from within the hanger bracket so that threaded end extends outward through the fastening bolt opening 140 of the cam 130. Use of the reinforcement plate 122 also allows the fastening bolt head to be recessed into the hanger bracket side to avoid contact between the fastening bolt 144 and the control arm bush 150. The square shape of the fastening bolt bore 146 will restrict turning of the fastening bolt 144 and allows a mated nut 148 to be installed or removed without removing the bush 150 from the hanger bracket 102.

As shown in FIG. 1, a bush end 152 of a suspension control arm 154, having a bush pin receiver 156 therethrough, is positioned between the inside face 114 of the inboard hanger side 106 and the inside face 116 of the outboard hanger side 108, and oriented such that the bush pin receiver 156 is aligned with the bush pin bores 124 formed through both the outboard and inboard hanger bracket sides 106 and 108. A bush pin 128, preferably a compression bolt, is secured through the bush pin opening 134 of each cam, the bush pin bores 125 of the reinforcement plates 122, the elongated bush pin bore 124 of each hanger side 106 and 108 and the bush pin receiver 156 of the control arm bush end 152 and secured with nut 167.

A spindle 158 is rotatably fixed through the spindle hole 132 of the cam 130 and provides a fulcrum point about spindle opening 138 of the reinforcement plate 122 which the cam 130 articulates. As a rotational force is applied about the square opening 136 of the cam 130, the spindle 158 limits rotation of the cam 130 around the bush pin 128 eliminating any cam twist, which could develop under such force. The spindle 158 may be a round bar affixed to spindle hole 132 of the cam 130 either through interference fit or preferably welded. Alternatively, the spindle 128 may be a rivet, bolt or may be a protrusion pre-formed onto the cam 130.

When the bush pin 128 and the fastening bolt 144 are secured, the bush end 152 of the control arm 154 is fixed into position within the hanger bracket 102. If the bush pin 128 and the fastening bolt 144 are loosened, each cam 130 can be articulated about the spindle 158, either within the limitations defined by the arcuate-shaped fastening bolt opening 140 of the cam 130 or by bush pin 128 movement within the horizontal bush pin bore 124 of each hanger bracket side 106 and 108. It is preferable that a cam 130 be provided at both the inboard and outboard hanger sides 106 and 108, in alignment to prevent binding, or undesirable stress within the hanger bracket 102. This can be accomplished by uniform alignment of the tang 142 on each cam 130 relative to the reinforcement plate 122.

Actuation via a breaker bar on the square opening 136 on each cam 130 causes horizontal displacement of the bush pin 128 within the elongated bush pin bore 124. Horizontal movement of the bush pin 128 allows alignment of the suspension control arm 154 in relation to the vehicle chassis 100. As the control arm is fixed to the axle 106, as shown in FIG. 1, any change in relation between the bush end 152 of the control arm 154 within the suspension hanger bracket 102 results in linear forward or rearward movement of the axle 106 with respect to the vehicle chassis 100.

When the desired alignment of the axle 106 is achieved, determined by the control arm bush 150 orientation within the hanger bracket 102, the bush pin 128 and fastening bolts 144 are tightened. The fastening bolts 144 and bush pin 128 provide two distinct compression points which secures the control arm bush 150 relative to the bracket 102 and greatly reduces the potential for undesired displacement during vehicle operation.

When the axle 160 is aligned and the bush pin 128 and fastening bolts 144 are secured, significant clamping pressure should be exerted to maintain control arm bush 150 positioning. The suspension hanger is also provided with an upper shock absorber bracket 162, preferably on the inboard side 106, substantially near the mounting plate 104.

Each suspension system requires two opposed hanger brackets positioned on either side of the vehicle chassis. It is understood that the disclosure herein specifically describes a single hanger bracket and the second hanger bracket would be a mirror image of the first.

Having specifically described illustrative embodiments of the invention with reference to the accompanying drawings, it is to be understood that the invention is not limited to those precise embodiments and that various changes and modifications may be effected therein by one skilled in the art without departing from the scope and spirit of the invention as defined in the appended claims.

What is claimed is:

1. An adjustable suspension hanger, comprising:
a mounting plate for attachment to a vehicle chassis;
an inboard hanger side and opposed outboard hanger side depending from the mounting plate, the inboard hanger side and the outboard hanger side each having an outer face, an inner face, and, in axial alignment, an elongated bush pin bore and a fastening bolt bore;
a first cam positioned adjacent an outer face of the outboard hanger side, the first cam having a bush pin opening and a slotted fastening bolt opening which are alignable, in series, with the bush pin bore and fastening bolt bore of the outboard hanger side, and further having a spindle bore;
at least one reinforcement plate having a spindle hole, an elongated bush pin bore and a fastening bolt bore, and fixed to the outer face of the outboard hanger side and inboard of the first cam, so the elongated bush pin bore and the fastening bolt bore of the reinforcement plate align with the elongated bush pin bores and the fastening bores of the hanger sides;
a bush pin for mounting a control arm bush, the bush pin removably fastened through the bush pin opening of the first cam, the elongated bush pin bore of the at least one reinforcement plate, the elongated bush pin bore of the inboard hanger side, through the control arm bush and the elongated bush pin bore of the outboard hanger side;
a spindle rotatably fastened through the spindle bore of the first cam and fixed into the spindle hole of one of the at least one reinforcement plates;
a fastening bolt fastened through the fastening bolt bore of the outboard hanger side, and rotatably retained in the fastening bolt bore of the reinforcement plate and extending through the slotted fastening bolt opening of the first cam; and
wherein actuation of the first cam about the spindle horizontally displaces the bush pin within the elongated bush pin bore thereby aligning the control arm bush respective to the vehicle chassis.

2. The adjustable suspension hanger of claim 1 wherein the first cam is positioned adjacent an outer face of the inboard reinforcement plate.

3. The adjustable suspension hanger of claim 1 wherein the at least one reinforcement plate further comprises a second reinforcement plate positioned adjacent to the outer face of the inboard hanger side.

4. The adjustable suspension hanger of claim 3, further comprising a second cam positioned adjacent to the second reinforcement plate and having a spindle opening, bush pin opening and a slotted fastening bolt opening which, are alignable, in series, with the spindle bore of the second reinforcement plate and the elongated bush pin bores and fastening bolt bores of the inboard hanger side, the outboard hanger side and the second reinforcement plate.

5. The adjustable suspension hanger of claim 1 wherein the first cam further comprises a square opening substantially adjacent the slotted fastening bolt opening.

6. The adjustable suspension hanger of claim 1 wherein the fastening bolt has a square shank and the fastening bolt bore of the reinforcement plate is mated to the square shank.

7. The adjustable suspension hanger of claim 1 wherein the slotted fastening bolt opening is arcuate.

8. An adjustable suspension hanger, comprising:
a hanger bracket dependant from a vehicle chassis having an inboard side and an opposed outboard side, a horizontally elongated bush pin bore and a fastening bolt bore through the inboard side and the outboard side;
a first cam movably positioned adjacent an outer face of the hanger inboard side and a second cam movably positioned adjacent an outer face of the hanger outboard side; the first cam and second cam each having a spindle opening, a bush pin opening alignable with the elongated bush pin bore and an arcuate-shaped fastening bolt opening alignable with the fastening bolt bore;
a first side reinforcing plate interposed intermediate the hanger inboard side and the first cam and a second side reinforcing plate interposed intermediate the hanger outboard side and the second cam, each of the first and second side reinforcing plates having a first bore aligned with and congruent with the spindle opening of the first and second cams, a second bore aligned with and congruent with the horizontally elongated bush pin bore of the hanger inboard and outboard sides, and a third bore aligned with the fastening bolt bore of the hanger inboard and outboard sides;
a control arm bush, with a bush pin receiver therethrough, mounted between the opposed hanger sides;
a bush pin mounted through the bush pin openings of the first and second cams, the second bores of the first and second side reinforcement plates, and the horizontally elongated bush pin bores of the inboard and outboard hanger sides;
at least two spindles, each spindle rotatably mounted through one of the spindle openings of the first and second cams and secured into the first bore of the adjacent side reinforcement plate;
at least two fastening bolts, each fastening bolt mounted through the fastening bolt bore of one of the inboard and outboard hanger sides, through the third bore of one of the first and second side reinforcement plates and through the arcuate-shaped fastening bolt opening of one of the first and second cams; and
wherein horizontal alignment of a control arm respective to the vehicle chassis is achieved by actuation of the first and second cams about the at least two spindles with the arcuate-shaped fastening bolt openings of the first and second cams limiting vertical displacement of the bush pin within the elongated bush pin bores of the inboard and outboard hanger sides and the first and second side reinforcing plates.

9. The suspension assembly of claim 8 wherein the fastening bolt is a carriage bolt having a square shank and a substantially flat head and the fastening bolt bore of each of the inboard and outboard sides of the hanger bracket is enlarged so that when the carriage bolt is inserted through one of the fastening bolt bores of the inboard and outboard sides of the hanger bracket and one of the fastening bolt openings of the first and second cams, the head is flush with an inner face of one of the hanger inboard and outboard sides and the square shank is retained within the third bore of one of the first and second side reinforcing plates that is aligned with the fastening bolt bore of the hanger inboard and outboard sides.

10. The suspension assembly of claim 8 further comprising a shock absorber bracket substantially adjacent one of the hanger bracket inboard and outboard sides.

11. The suspension assembly of claim 8 wherein each of the first and second cams includes a square opening substantially adjacent the arcuate fastening bolt opening.

* * * * *